United States Patent
Huang et al.

(10) Patent No.: US 8,254,573 B2
(45) Date of Patent: Aug. 28, 2012

(54) SYSTEM AND METHOD FOR CIPHERING KEY FORWARDING AND RRC PACKET DECIPHERING IN A UMTS MONITORING SYSTEM

(75) Inventors: Fangming Huang, Plano, TX (US); Baoyuan Wang, Plano, TX (US)

(73) Assignee: Tektronix, Inc., Beaverton, OR (US)

( * ) Notice: Subject to any disclaimer, the term of this patent is extended or adjusted under 35 U.S.C. 154(b) by 845 days.

(21) Appl. No.: 12/043,101

(22) Filed: Mar. 5, 2008

(65) Prior Publication Data

US 2008/0240438 A1    Oct. 2, 2008

Related U.S. Application Data

(60) Provisional application No. 60/909,282, filed on Mar. 30, 2007.

(51) Int. Cl.
*H04K 1/00* (2006.01)
(52) U.S. Cl. ........ 380/255; 380/270; 380/277; 380/278; 380/279
(58) Field of Classification Search .................. 380/255, 380/270, 277, 278
See application file for complete search history.

(56) References Cited

U.S. PATENT DOCUMENTS

| | | | | |
|---|---|---|---|---|
| 6,768,903 | B2 * | 7/2004 | Fauconnier et al. | 455/403 |
| 7,535,848 | B2 | 5/2009 | Dong et al. | |
| 2003/0021418 | A1 * | 1/2003 | Arakawa et al. | 380/277 |
| 2003/0119482 | A1 * | 6/2003 | Girard | 455/411 |
| 2005/0265551 | A1 * | 12/2005 | Hara | 380/270 |
| 2007/0207770 | A1 * | 9/2007 | Ikaheimo | 455/403 |
| 2008/0191708 | A1 | 8/2008 | Oka et al. | |

FOREIGN PATENT DOCUMENTS

| | | |
|---|---|---|
| EP | 1 976 225 A3 | 8/2009 |
| JP | 2007-068162 | 3/2007 |
| WO | WO/2005/109685 A1 | 11/2005 |
| WO | 2005/125246 A1 | 12/2005 |

\* cited by examiner

*Primary Examiner* — Carl Colin
*Assistant Examiner* — Ali Shayanfar
(74) *Attorney, Agent, or Firm* — Michael J. Fogarty, III

(57) ABSTRACT

System and method for forwarding a ciphering key to a decipher application comprising capturing a first message carrying the ciphering key from a first network interface, identifying a network node associated with the first network interface, identifying a monitor responsible for processing messages captured from interfaces coupled to the network node, and forwarding the ciphering key to the monitor. In an alternative embodiment, the method may further comprise capturing second messages carrying encrypted messages from a second network interface, and deciphering the second messages using the ciphering key. The method may also comprise identifying user equipment associated with the first messages, and selecting a deciphering application running on the monitor using a user equipment identity.

13 Claims, 5 Drawing Sheets

SYSTEM AND METHOD FOR CIPHERING KEY FORWARDING AND RRC PACKET DECIPHERING IN A UMTS MONITORING SYSTEM

This application claims the benefit of U.S. Provisional Application No. 60/909,282, filed on Mar. 30, 2007, entitled System and Method for Ciphering Key Forwarding and RRC Packet Deciphering in a UMTS Monitoring System, which application is hereby incorporated herein by reference.

TECHNICAL FIELD

The present invention relates generally to a system and method for monitoring messages in a wireless system and, more particularly, to a system and method for forwarding ciphering keys captured in a core network to a monitor that is deciphering RRC packets captured in the UTRAN.

BACKGROUND

The Universal Mobile Telecommunications System (UMTS) is a third-generation (3G) mobile phone technology standardized first by the European Telecommunications Standards Institute (ETSI) and now by the 3rd Generation Partnership Project (3GPP). UMTS carries both circuit switched (CS) and packet switched (PS) traffic using Wideband Code Division Multiple Access (W-CDMA) as its air interface. The description of the network components and protocols used in UMTS are well known to those of ordinary skill in the art and are available to the public from 3GPP, ETSI, and other sources. The UMTS network architecture consists of three domains: Core Network (CN), UMTS Terrestrial Radio Access Network (UTRAN), and User Equipment (UE).

The Core Network provides switching and routing for user traffic and provides network management functions. The Core Network architecture is based on the GSM network with GPRS. The UTRAN provides the air interface access to subscribers' UE. Base stations in the UTRAN are referred as Node-Bs, and the control equipment for the Node-Bs is called a Radio Network Controller (RNC). The UMTS User Equipment communicates via the WCDMA air interface to the Node-Bs. The UE may be attached to either the PS domain or CS domain or both. The UE is capable of simultaneously using PS services and CS services.

UMTS defines several interfaces and protocols for exchanging data between network components to set up voice and data calls to the UE. Each call comprises numerous messages that pass across various interfaces. In order to fully analyze a call, all of the messages for the call must be collected and correlated. One disadvantage of the prior art is that some data packets are encrypted and must be deciphered before they can be analyzed. For example, the Radio Resource Control (RRC) packets require a Ciphering Key (CK) to be deciphered. However, the CK is not available on the same interfaces that pass the RRC packets.

A second disadvantage of the prior art is that network monitoring equipment may be widely distributed to monitor a UMTS network. As a result, a monitor or probe that captures a CK may not be co-located with a monitor that captures an RRC packet that needs the CK to be deciphered.

SUMMARY OF THE INVENTION

These and other problems are generally solved or circumvented, and technical advantages are generally achieved by embodiments of the present invention that provides a system and method for capturing ciphering keys from a UMTS network and passing the ciphering keys to applications that are deciphering encrypted packets.

In accordance with an embodiment of the present invention, a method for forwarding a ciphering key to a decipher application comprises capturing a first message carrying the ciphering key from a first network interface, identifying a network node associated with the first network interface, identifying a monitor responsible for processing messages captured from interfaces coupled to the network node, and forwarding the ciphering key to the monitor. In an alternative embodiment, the method may further comprise capturing second messages carrying encrypted messages from a second network interface, and deciphering the second messages using the ciphering key. The method may also comprise identifying user equipment associated with the first messages, and selecting a deciphering application running on the monitor using a user equipment identity. The first network interface may be an IuCS or IuPS interface in a UMTS core network, and the second network interface may be an Iub or Iur interface in a UTRAN. The network node is a radio network controller in a UTRAN. The ciphering key may be stored in a memory until required by the deciphering application. The deciphering application may be delayed for a preselected period after capturing the second messages to ensure that the ciphering key is available.

In accordance with another embodiment of the present invention, a system for providing a ciphering key to a deciphering application comprises a first monitor coupled to a first set of interfaces, wherein a ciphering key extraction application running on the first monitor captures the ciphering keys from the messages carried on the first set of interfaces; a second monitor coupled to a second set of interfaces, wherein a deciphering application deciphers data packets captured from the second set of interfaces; and a communications link coupling the first and second monitors, wherein the ciphering key is provided from the first monitor to the second monitor via the communications link. The first monitor may provide the ciphering key and a user equipment identifier to the second monitor. The system may further comprise a memory in the second monitor for holding the ciphering key for use by the deciphering application. The first monitor and the second monitor may run on separate blades in a same equipment rack, or the first monitor and the second monitor may be in different locations.

In accordance with another embodiment of the present invention, a method for deciphering data packets comprises extracting a ciphering key from a message carried on a first network interface, determining a first user equipment identifier associated with the ciphering key, forwarding the ciphering key to a deciphering application, receiving encrypted data packets at the deciphering application, determining a second user equipment identifier associated with the encrypted data packets, wherein the second user equipment identifier corresponds to the first user identifier, and deciphering the encrypted data packets using the ciphering key. The method may further comprise storing the ciphering key and the first user equipment identifier in a memory associated with the deciphering application, and retrieving the ciphering key from the memory using the second user equipment identifier.

Embodiments of the present invention allow a monitoring system to link a ciphering key captured in one part of the network to encrypted messages captured in a different part of the network. The present invention also allows the monitoring equipment to provide ciphering keys to deciphering applications that are running on the same equipment or different equipment as the monitors that captured the ciphering keys.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION

The present invention provides many applicable inventive concepts that can be embodied in a wide variety of specific contexts. The specific embodiments discussed are merely illustrative of specific ways to make and use the invention, and do not limit the scope of the invention.

Figure 1:
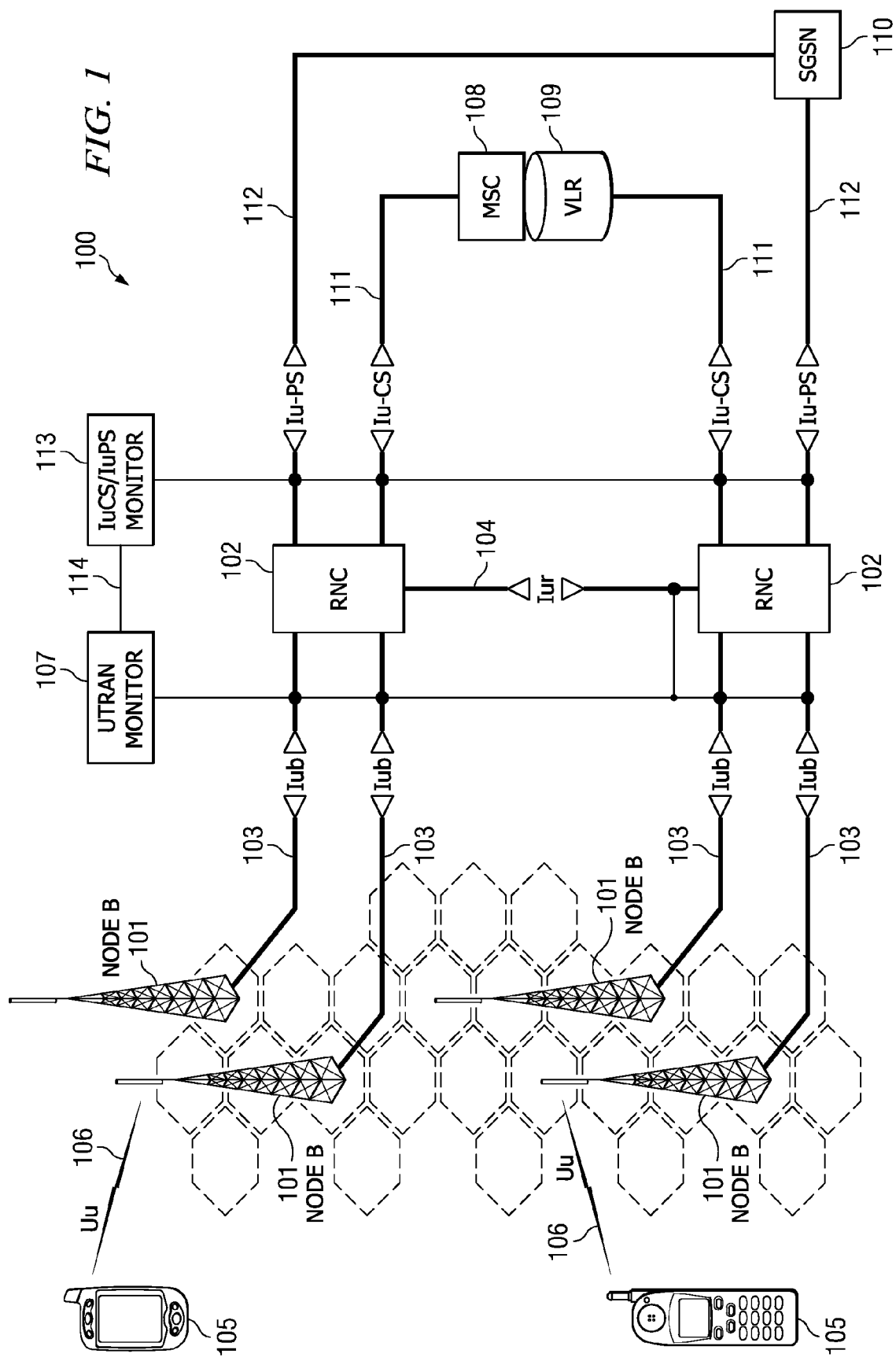
FIG. 1 is a block diagram illustrating elements of a UMTS network and monitoring equipment according to one embodiment of the invention.

FIG. 1 illustrates a portion of UMTS 100 network comprising Node Bs 101 and Radio Network Controllers (RNCs) 102. Node Bs 101 communicate with RNCs 102 via Iub interfaces 103. RNCs 102 communicate with each other via Iur interface 104. Node B 101 is in communication with User Equipment (UE) 105 via air interface Uu 106. Whenever UEs 105 make or receive a call, signaling messages are exchanged between Node Bs 101 and RNCs 102 over Iub interfaces 103 and, for some calls, between RNCs 102 over Iur interfaces 104. RNCs 102 and Node Bs 101 make up the UTRAN portion of UMTS network 100. UTRAN monitor or probe 107 is coupled to Iub and Iur interfaces 103 and 104 in the UTRAN. UTRAN monitor 107 is non-intrusively coupled to the interfaces to capture substantially all of the protocol messages traveling across the Iub and Iur interfaces. UTRAN monitoring equipment 107 identifies the messages belonging to each voice or data call and correlates those messages into one call record per call.

FIG. 1 also illustrates components of the Core Network portion of UMTS 100. Mobile Switching Center (MSC) 108, Visitor Location Register (VLR) 109, and Serving GPRS Support Node (SGSN) 110 are part of the Core Network. Circuit switched traffic is routed from the Core Network to the UTRAN via MSC 108 over IuCS interface 111. Packet switched traffic is routed from the Core Network to the UTRAN via IuPS interfaces 112. IuCS/IuPS monitor or probe 113 is non-intrusively coupled to IuCS and IuPS interfaces 111 and 112 to capture substantially all of the protocol messages traveling across the IuCS and IuPS interfaces. IuCS/IuPS monitor 113 identifies the messages belonging to each voice or data call and correlates those messages into a single call record per call. IuCS/IuPS monitor 113 and UTRAN monitor 107 communicate with each other via inter-monitor connection 114. Monitors 107 and 113 can exchanged call records, protocol messages, and other information via connection 114.

Encrypted Radio Resource Control (RRC) messages pass across Iub interface 103 and Iur interface 104 of the UTRAN. UTRAN monitor 107 needs to decipher the encrypted RRC messages to correctly process the signaling units and call records in the UTRAN. The Ciphering Key (CK) is the most important element for deciphering the RRC messages. IuCS/IuPS monitor 113 can capture the CK from IuCS interface 111 and/or IuPS interface 112. The CK must then be forwarded from the IuCS/IuPS monitoring application running on monitor 113 to the UTRAN deciphering application running on monitor 107 so that the CK can be used for deciphering. However, the IuCS/IuPS monitoring application and the UTRAN deciphering application may be running in different locations or in the same location on separate processors or separate blades. The present invention forwards CKs from the IuCS/IuPS monitoring application to deciphering applications running on either the same or different monitor as the IuCS/IuPS monitoring application. The invention makes the UTRAN deciphering application portable and robust, and increases the successful deciphering rate for the UMTS monitoring equipment.

Figure 2:
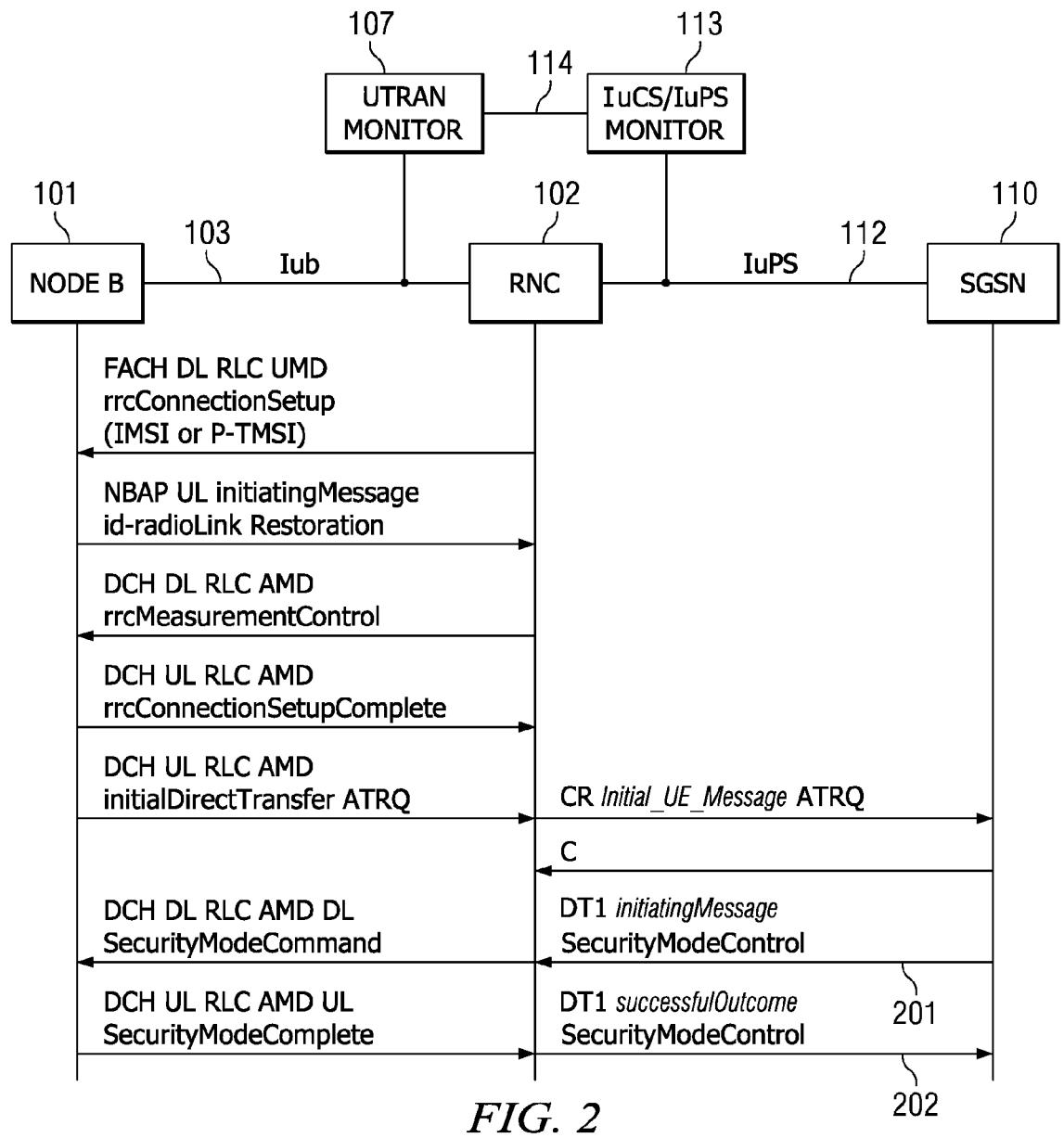
FIG. 2 illustrates messages passing across Iub and IuPS interfaces in a UMTS network.
Figure 3:
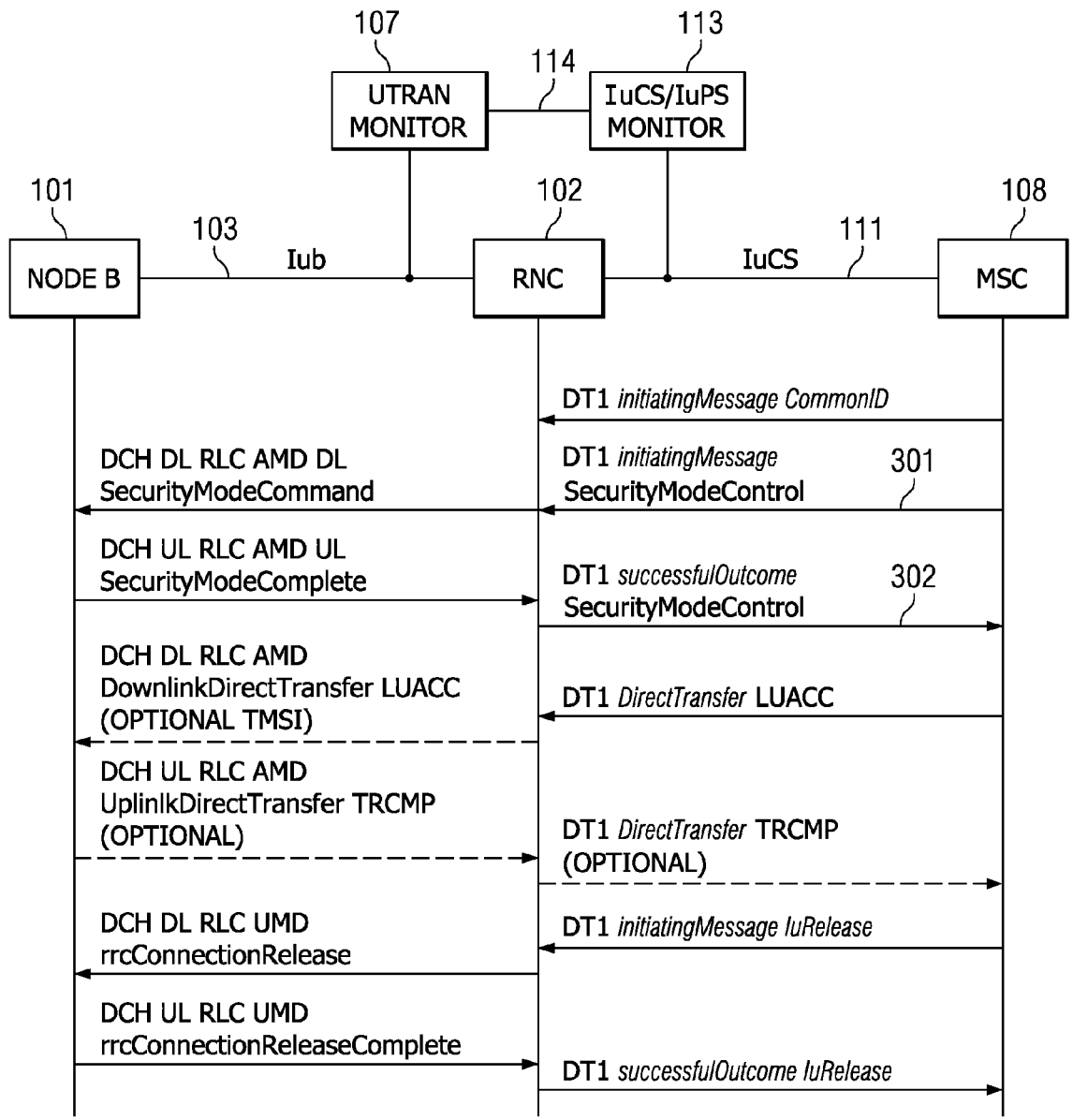
FIG. 3 illustrates messages passing across Iub and IuCS interfaces in a UMTS network.

CKs can be captured at IuCS and IuPS interfaces 111 and 112 in the Core Network. The encrypted RRC packets to be deciphered are captured from the Iub and Iur interfaces 103 and 104 in the UTRAN. These messages are captured by two separate applications. The CK must be forwarded from the core network monitoring application to the UTRAN monitoring application to decipher the RRC packets. FIG. 2 illustrates the flow of messages across the Iub and IuPS interfaces. SecurityModeControl messages 201 and 202 on IuPS interface 112 carry the CKs. FIG. 3 illustrates the flow of messages across the Iub and IuCS interfaces. SecurityModeControl messages 301 and 302 on IuCS interface 111 also carry CKs. The CKs are not directly available to UTRAN monitor 107 which only monitors the Iub and Iur interfaces.

It will be understood by those of skill in the art that monitors 107 and 113 may be embodied in numerous forms, such as in the same single location or multiple different locations. Additionally, those of skill in the art will understand that multiple UTRAN monitors and/or multiple IuCS/IuPS monitors may be used to monitor various locations and interfaces in the UMTS system. The IuCS/IuPS monitor described herein may also be embodied as two or more separate monitors that are connected to only a IuCS or IuPS interface or to both interfaces. In one embodiment, monitors 107 and 113 may be deployed at the same RNC, where they can be coupled to the Iub, Iur, IuCS and IuPS connected to that RNC. In this scenario, the UTRAN monitoring application, UTRAN deciphering application, and IuCS/IuPS monitoring application may run on the same equipment, such as on different blades in the same equipment rack. However, even in this situation, the monitoring applications run separately, and the CKs need to be forwarded from the IuCS/IuPS monitoring application to the UTRAN deciphering application on the equipment rack. The CKs may be forwarded across connection 114, which may be an intra-monitor bus or backplane between blades in the equipment rack. In another embodiment, monitor 107 is deployed at an RNC, and monitor 113 is deployed at MSC 108 or SGSN 110 to monitor IuCS/IuPS traffic. In this scenario, the CKs need to be forwarded from IuCS/IuPS monitor 113 to the UTRAN deciphering application on UTRAN monitor 107 via connection 114, which may be an inter-monitor packet switched network connection, for example. The present invention is intended to cover both co-located and remotely located applications.

When a IuCS/IuPS monitor captures a CK, the IuCS/IuPS monitoring application will attempt to transfer the CK to the proper UTRAN decoding application that is handling a call related to the captured CK. The IuCS/IuPS monitoring application will first attempt to forward the CK to a co-located decoding application running on the same equipment. If the CK cannot be tied to a call being processed by a co-located decoding application, then the IuCS/IuPS monitoring application will attempt to identify a separate UTRAN monitor that is processing a call associated with the CK.

Figure 4:
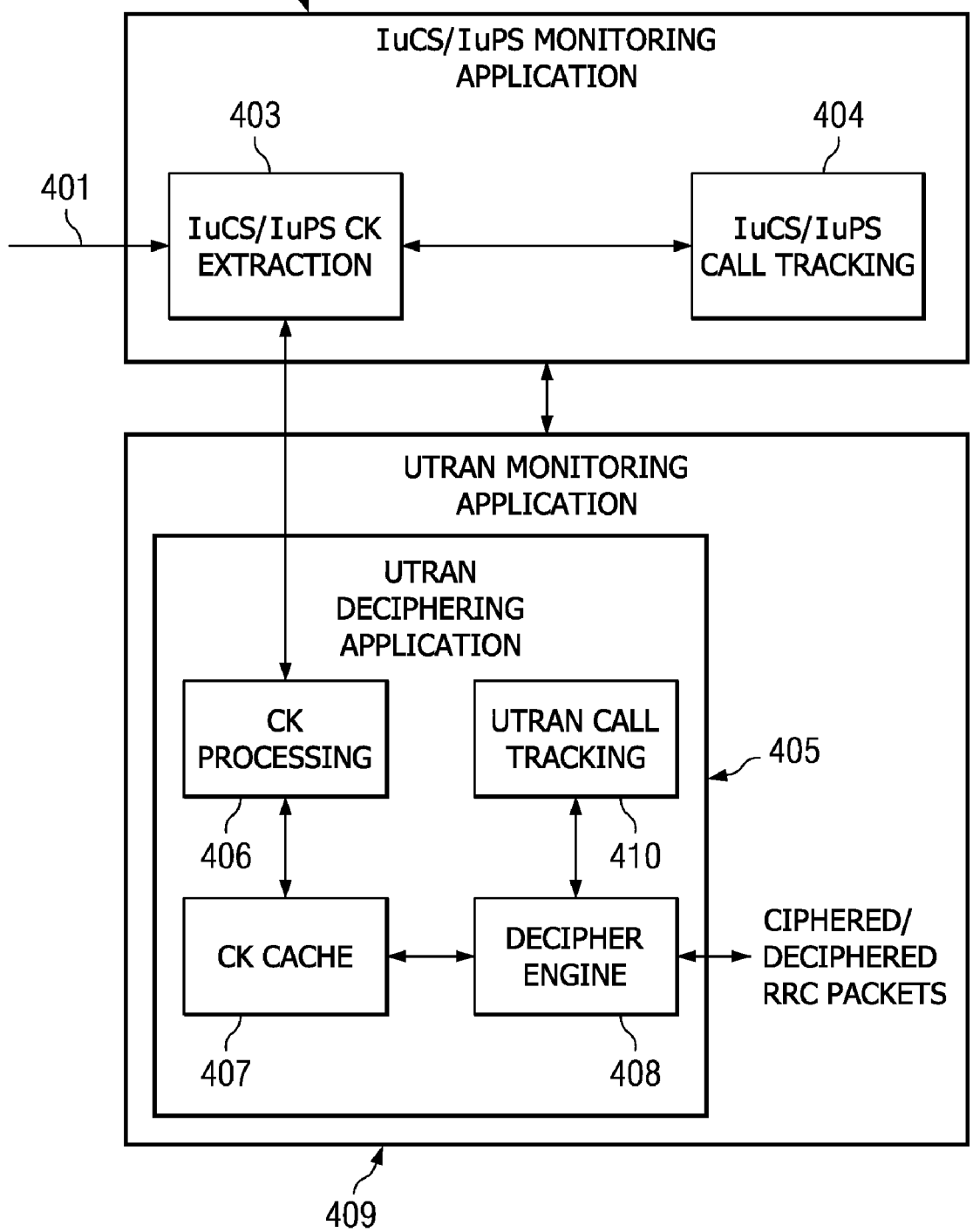
FIG. 4 is a block diagram illustrating the relationship between applications in a UMTS network monitoring system according to one embodiment of the invention.

When IuCS and IuPS interfaces in the Core Network and the Iub and Iur interfaces in the UTRAN are monitored by the same equipment or probe, the CKs are forwarded from the IuCS/IuPS monitoring application to the UTRAN deciphering application within the probe using inter-process messages. These inter-process messages allow data to be exchanged between applications or processes running on the same monitor or probe. FIG. 4 illustrates how CK forwarding is accomplished using one embodiment of the present invention. The invention must address three issues; first, to determine which deciphering application should receive the CK; second, to map the CK to a UTRAN call; and third, to ensure that the CK is timely sent and available to the UTRAN deciphering algorithm when deciphering begins.

In embodiments of the invention, the probe is a distributed monitoring system in which multiple UTRAN deciphering applications are running. The CKs are carried in SecurityModeCommand messages captured from the IuCS/IuPS interfaces by link 401 and forwarded to IuCS/IuPS monitoring application 402. The captured messages are processed by IuCS/IuPS CK Extraction application 403 to extract the CKs, which then need to be tied to a particular call. When a CK is captured, IuCS/IuPS monitoring application 404 keeps the information that identifies the core network interface from which the CK was captured from and to which IuCS/IuPS call the CK belongs in IuCS/IuPS Call Tracking application 404. IuCS/IuPS monitoring application 402 extracts the International Mobile Station Identity (IMSI) and Temporary Mobile Subscriber Identity (TMSI), if any, for the IuCS/IuPS call to which the CK belongs. The IMSI and TMSI data is maintained in IuCS/IuPS Call Tracking application 404.

IuCS/IuPS monitoring application 402 queries a central database to retrieve the RNC Id of the interface, which corresponds to the RNC that is served by the interface. The central database may reside on IuCS/IuPS monitor 113, UTRAN monitor 107, or at some other location. There may be multiple deciphering applications operating simultaneously to process messages captured from the UTRAN interfaces. The deciphering applications serve one or more RNCs in the UTRAN and may be registered with the monitoring system. IuCS/IuPS monitoring application 402 queries all the registered deciphering applications, such as application 405, to identify which UTRAN deciphering application is monitoring the RNC. Once the proper UTRAN deciphering application is identified, IuCS/IuPS monitoring application 402 sends the CK, along with the associated IMSI and TMSI data, to the destination via an inter-process message. UTRAN deciphering application 405 processes the CKs in CK processing application 406 and stores the CK and IMSI/TMSI in CK Cache 407.

Decipher engine 408 receives encrypted RRC packets from UTRAN monitoring application 409. Decipher engine 408 first retrieves the UTRAN call record from UTRAN call tracking application 410 for the encrypted RRC message to get the associated IMSI/TMSI data. Then, using the IMSI/TMSI, the UTRAN deciphering application searches CK cache 407 for a CK that is associated with the IMSI/TMSI and, as a result, with the encrypted RRC packet. The CK is retrieved if the CK's IMSI/TMSI matches the IMSI/TMSI of the UTRAN call. The CK is then used to decipher the RRC packet.

To minimize timing issues caused by routing and storing CKs from IuCS/IuPS monitoring application 402 to UTRAN monitoring application 409, decipher engine 408 delays processing all UTRAN packets by, for example, 4 seconds. As the consequence, UTRAN deciphering application 405 should get the CK before it starts deciphering any encrypted RRC packets.

In the situation where core network and UTRAN are monitored by probes in different locations, the core network monitors need to forward CKs to the UTRAN monitors. This can be accomplished using a ciphering key mapping between the UTRAN Probe Id, RNC Id, and Interface Id, such as, for example:

| Ciphering Key Map | | |
|---|---|---|
| Interface Id | RNC Id | UTRAN Probe Id |

The Interface Id corresponds to a particular IuCS or IuPS interface in the Core Network. The RNC Id corresponds to the RNC that is associated with that IuCS or IuPS interface. The UTRAN Probe Id corresponds to the UTRAN probe that is running the UTRAN monitoring applications for that RNC. Using the ciphering key map, the IuCS/IuPS monitoring application can get the UTRAN Probe Id and RNC Id using the Interface Id for the interface that carried the CK. The UTRAN Probe Id identifies the remote UTRAN monitor that should receive the CK. The RNC Id is used to identify the UTRAN deciphering application that is processing RRC messages that will need to be deciphered.

The monitoring system can define a ciphering group to automatically establish an inter-probe connection to be used when CKs need to be forwarded between probes. In one embodiment, when a CK is received by an IuCS/IuPS monitoring application, it will first determine if the CK should be forwarded by inter-process message within the same monitor. If the CK needs to be sent to a different monitor, then the ciphering group will execute inter-probe logic to forward the CK to the destination monitor.

Figure 5:
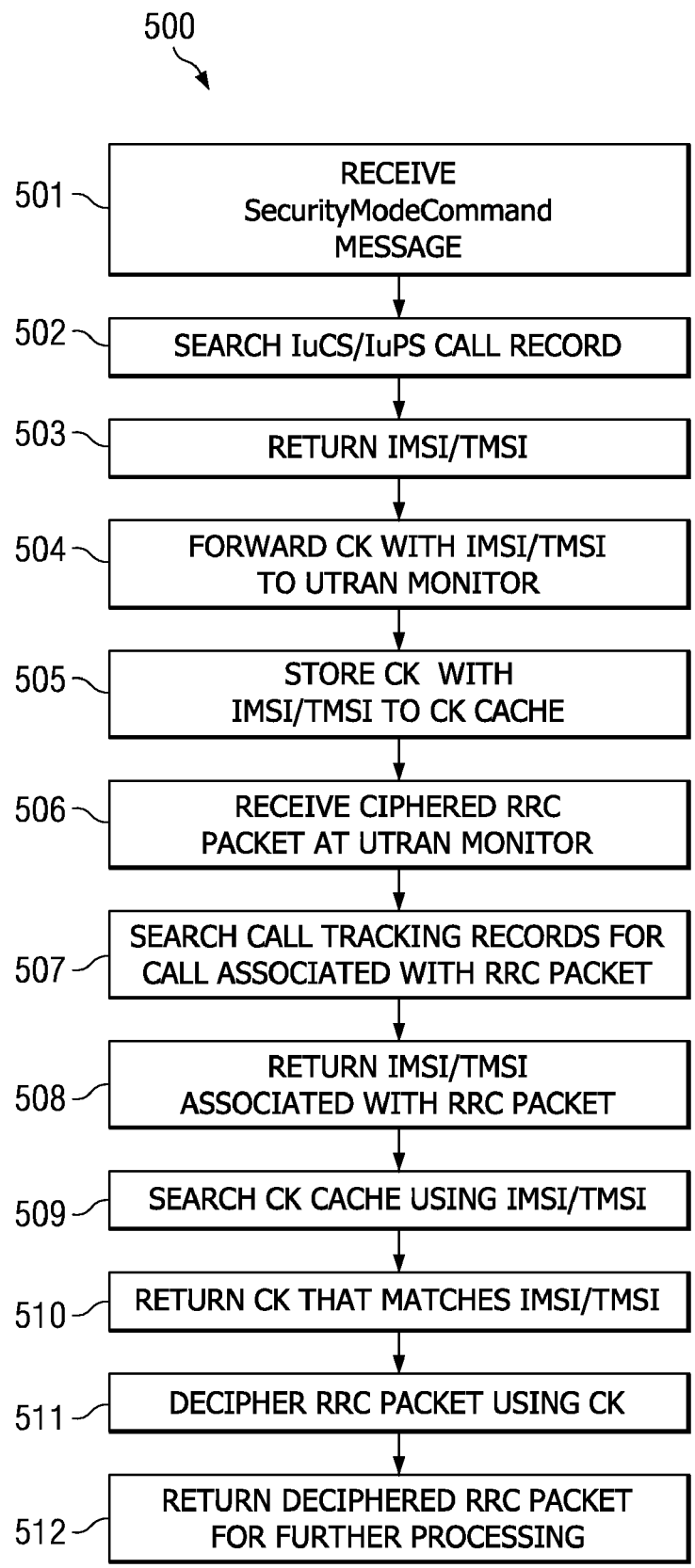
FIG. 5 is a flowchart illustrating a method for forwarding ciphering keys according to one embodiment of the invention.

FIG. 5 is a flow chart 500 illustrating one embodiment of a method for processing CKs. In 501, a IuCS/IuPS monitor receives a SecurityModeCommand message with a CK or other message that contains a ciphering key. The IuCS/IuPS monitor then searches for the associated IuCS/IuPS call record in 502. In 503, the IMSI and/or TMSI are returned for the call associated with the CK. At this point, the IuCS/IuPS monitor can also determine whether the relevant UTRAN monitoring application is located on the same or a remote monitor. Using the appropriate intra- or inter-probe message forwarding, in 504, the CK and IMSI/TMSI is forwarded to the local or remote UTRAN monitor. In 505, the CK is stored with the IMSI/TMSI to a CK cache.

In 506, a decipher engine in the UTRAN monitor receives a ciphered RRC packet. The decipher engine searches call tracking records, in 507, to identify the call record associated with the RRC packet. In 508, the IMSI/TMSI associated with the RRC packet are returned to the decipher engine and, in 509, the IMSI/TMSI are used to search the CK cache. In 510, a CK matching the IMSI/TMSI is returned to the decipher engine, and the CK is used to decipher the RRC packet in 511. After deciphering, the RRC packet is returned to the UTRAN monitoring application for further processing.

It will be understood by those of skill in the art, that the RRC packet cannot be deciphered until the CK is received. This may be accomplished by delaying the RRC deciphering application to optimize the arrival of the CK at the decipher engine. Alternatively, the decipher engine may hold the RRC packet and delay the deciphering process until the proper CK is available for that message. Accordingly, the order of the steps in flowchart 500 may be varied so that the recited events happen in a different order or simultaneously.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
capturing a first message with a probe configured to monitor a first network interface established in a core portion of a telecommunications network;
extracting a ciphering key and an identifier from the first message;
identifying a radio network controller associated with the first network interface;
selecting, using a ciphering key map, one of a plurality of monitoring applications responsible for processing encrypted messages captured from a second network interface established in a terrestrial portion of the telecommunications network, the selected one of the plurality of monitoring applications being configured to serve the identified radio network controller, an entry of the ciphering key map including an interface identifier corresponding to the first network interface, a radio network controller identifier corresponding to the radio network controller associated with the first network interface, and a monitoring application identifier corresponding to the selected one of the plurality of monitoring applications; and
forwarding the ciphering key and the identifier to the selected one of the plurality of monitoring applications, the selected one of the plurality of monitoring applications configured to store the ciphering key and the identifier in a memory, receive an encrypted message via the second network interface, retrieve the ciphering key from the memory in response to the identifier matching an identifier of a call tracking record associated with the encrypted message, and decipher the encrypted message using the ciphering key.

2. The method of claim 1, the identifier including an International Mobile Station Identity (IMSI) or a Temporary Mobile Subscriber Identity (TMSI).

3. The method of claim 1, wherein the first network interface is an IuCS or IuPS interface in a UMTS core network.

4. The method of claim 1, wherein the second network interface is an Iub or Iur interface in a UTRAN.

5. The method of claim 1, the selected one of the plurality of monitoring applications being remotely located with respect to the probe configured to monitor the first network interface.

6. The method of claim 1, the selected one of the plurality of monitoring applications being further configured to delay the deciphering of the encrypted message by a preselected time period.

7. The method of claim 1, the selected one of the plurality of monitoring applications being further configured to delay the deciphering of the encrypted message until it receives the extracted ciphering key and identifier.

8. A system comprising:
a hardware monitor coupled to a first interface of a core portion of a telecommunications network, the hardware monitor configured to capture a first message;
extract a ciphering key and an identifier from the first message;
identify a radio network controller associated with the first interface;
select, using a ciphering key map, one of a plurality of monitoring applications responsible for processing encrypted messages captured from a second interface established in a terrestrial portion of the telecommunications network, the selected one of the plurality of monitoring applications being configured to serve the identified radio network controller, an entry of the ciphering key map including an interface identifier corresponding to the first interface, a radio network controller identifier corresponding to the radio network controller associated with the first interface, and a monitoring application identifier corresponding to the selected one of the plurality of monitoring applications; and
forward the ciphering key and the identifier to the selected one of the plurality of monitoring applications, the selected one of the plurality of monitoring applications configured to store the ciphering key and the identifier in a memory, receive an encrypted message via the second interface, retrieve the ciphering key from the memory in response to the identifier matching an identifier of a call tracking record associated with the encrypted message, and decipher the encrypted message using the ciphering key.

9. The system of claim 8, wherein the identifier includes an International Mobile Station Identity (IMSI) or a Temporary Mobile Subscriber Identity (TMSI).

10. The system of claim 8, wherein the first interface is an IuCS or IuPS interface in a UMTS core network.

11. The system of claim 8, wherein the second interface is an Iub or Iur interface in a UTRAN.

12. The system of claim 8, wherein the hardware monitor and the selected one of the monitoring applications are on separate blades in a same equipment rack.

13. The system of claim 8, wherein the hardware monitor and the selected one of the monitoring applications are in different locations.

* * * * *